United States Patent [19]
Grand et al.

[11] Patent Number: 6,009,218
[45] Date of Patent: Dec. 28, 1999

[54] VERTICAL POSITIONING OF AN OPTOELECTRONIC COMPONENT ON A SUPPORT RELATIVE TO AN OPTICAL GUIDE INTEGRATED INTO SAID SUPPORT

[75] Inventors: Gilles Grand, Grenoble; Pierre Gidon, Echirolles, both of France

[73] Assignee: Commissariat A L'Energie Atomique, Paris, France

[21] Appl. No.: 08/861,636

[22] Filed: May 22, 1997

[30] Foreign Application Priority Data

Jun. 6, 1996 [FR] France .................................. 96-06999

[51] Int. Cl.⁶ .................................................. G02B 6/10
[52] U.S. Cl. .............................. 385/14; 385/131; 385/129
[58] Field of Search .................................. 385/14, 49, 88, 385/89, 90, 91, 129, 130, 131, 132

[56] References Cited

U.S. PATENT DOCUMENTS

| | | | |
|---|---|---|---|
| 5,321,786 | 6/1994 | Valette et al. | 385/92 |
| 5,488,678 | 1/1996 | Taney et al. | 385/14 |
| 5,818,990 | 10/1998 | Steijer et al. | 385/49 |

OTHER PUBLICATIONS

S. Mino, et al, Electronic Letters, vol. 30, No. 22, pp. 1888–1890, Oct. 27, 1994, "Optoelectronic Hybrid Integrated Laser Diode Module Using Planar Lightwave Circuit Platform".

Yasufumi Yamada, et al., Proceedings of the Lasers and Electro–Optics Society Annual Meeting, No. –, pp. 204–205, Nov. 15, 1993, "LiNbO₃ Chip Assembly on Silica–Based Waveguide on Terraced Silicon Substrate".

Etienne E. L. Friedrich, et al., Journal of Lightwave Technology, vol. 10, No. 3, pp. 336–340, Mar. 1, 1992, "Hybrid Integration of Semiconductor Lasers with Si–Based Single–Mode Ridge Waveguides".

Masahiro Yanagisawa et al., IEEE Photonics Technology Letters, vol. 4, No. 1, pp. 21–23, Jan. 1992, "Film–Level Hybrid Integration of AlGaAs Laser Diode with Glass Waveguide on Si Substrate".

K.P. Jackson, et al., Journal of Lightwave Technology, vol. 12, No. 7, pp. 1185–1191, Jul. 1994, "A High–Density, Four–Channel, OEIC Transceiver Module Utilizing Planar–Processed Optical Waveguides and Flip–Chip, Solder–Bump Technology".

*Primary Examiner*—Hung N. Ngo
*Attorney, Agent, or Firm*—Oblon, Spivak, McClelland, Maier & Neustadt, P.C.

[57] ABSTRACT

A support designed for hybrid optoelectronics, including at least one integrated optical guide and including a substrate on which the optical guide has been created by depositing a suitable material on the substrate to create a lower confinement layer, a guide core layer, and an upper confinement layer. The optical guide is designed to be optically connected to an optoelectronic component mounted on the support, in which the support positions the component to ensure its optical alignment with the optical guide. The support includes abutments located at the core level, or defined in a confinement layer in relation to the core layer, to ensure the vertical positioning of the component. The invention also relates to processes for producing the support.

6 Claims, 8 Drawing Sheets

VERTICAL POSITIONING OF AN OPTOELECTRONIC COMPONENT ON A SUPPORT RELATIVE TO AN OPTICAL GUIDE INTEGRATED INTO SAID SUPPORT

BACKGROUND OF THE INVENTION

1. Field of the Invention

The present invention relates to vertical positioning of an optoelectronic component on a support that connects it optically with an optical guide integrated into said support.

2. Discussion of the Background

The development of integrated optics and the miniaturization of optoelectronic components have brought about the creation of hybrid apparatuses in which components (normally of the active type such as laser diodes, modulators, photodetectors, etc.) are mounted on a support where they can be optically connected to components described as passive (e.g. optical guides) integrated onto or into said support. Such a support may consist of a silicon substrate on which silica is deposited to produce one or more optical guides.

A considerable amount of work has been devoted to producing hybrid optoelectronic circuits. Most of this work has been on configurations in which the optical alignment between the mounted component and the optical guide may be described as simple: this is typically a photodetector lit by a beam of light conducted by an optical guide. A small proportion of this work concerns configurations in which the optical alignment between the mounted component and the optical guide constitute an optical coupling where great accuracy is required: for example, the alignment of a laser source with an optical guide. It will be understood that in this example alignment must be the best possible to give maximum efficiency of use.

A laser diode designed for mounting on a support to be connected to an integrated optical guide is a component whose transmitting strip is located near one surface of the component in order to be optically connected to an optical guide mounted on the surface of the support. When in place the laser diode is thus upside down.

Alignment is effected in all three spatial planes. When dealing with a flat support, alignment in the two planes of the support can be achieved satisfactorily using various methods known in the art (e.g. using mechanical stops, micronized shot, etc.). However, vertical alignment is difficult to achieve due to the process used to produce the optical guide. A silica on silicon optical guide (e.g. single mode 1.3 $\mu$m/1.55 $\mu$m) is usually produced by superimposing:

a layer of silica, known as the lower confinement layer, more than 12 $\mu$m thick ensuring optical insulation with the silicon support, a thinner guide core between 4 and 6 $\mu$m thick made of silica that has been doped to increase its refractive index. This layer may be etched or not depending on whether a planar or channel-type guide is required, a layer of silica, known as the upper confinement layer, more than 10 $\mu$m thick that insulates the core from the ambient air.

The layers of silica of this type of optical guide may, for example, be deposited using PECVD (plasma-enhanced chemical vapor deposition) technology. The thickness of these layers is very difficult to determine and relative inaccuracy can be very high: typically up to 10% for the upper confinement layer, i.e. ±1 $\mu$m, and 3% for the lower confinement layer, i.e. ±0.4 $\mu$m. Vertical alignment is usually determined in relation to the top of the upper confinement layer, i.e. in relation to the surface of the silicon support on which the silica layers are deposited. Such mechanical references are totally incompatible with correct optical alignment of the optical guide with the mounted component (typically ±0.25 $\mu$m for a laser diode structure).

Among the documents of the known art that concern the field of the invention, the following articles may be cited:

"Film-Level Hybrid Integration of AlGaAs Laser Diode with Glass Waveguide on Si Substrate" by M. Yanagisawa et al., published in "IEEE Photonics Technology Letters, Vol. 4, No. 1, January 1992, pages 21–23. (Reference 1), "Silica-based Optical Waveguide on Terraced Silicon Substrate as Hybrid Integration Platform" by Y. Yamada et al., published in "Electronics Letters", Vol. 29, No. 5, pages 444–446. (Reference 2), "A High-Density, Four-Channel OEIC Transceiver Module Utilizing Planar-Processed Optical Waveguides and Flip-Chip, Solder-Bump Technology" by K. P. Jackson et al., published in "Journal of Lightwave Technology", Vol. 12, No. 7, July 1994, pages 1185–1191. (Reference 3), "Hybrid Integration of Semiconductor Lasers with Si-based Single-Mode Ridge Waveguides" by E. E. L. Friedrich et al., published in "Journal of Lightwave Technology", Vol. 10, No. 3, March 1992, pages 336–340, (Reference 4), French patent FR-A-2 694 841 registered by the French Atomic Energy Commission, the equivalent of US patent U.S. Pat. No. 5,321,786. (Reference 5).

In Reference 1 the silicon support constitutes the vertical mechanical reference for mounting the component, a laser diode. The component is adjusted to the thickness of the lower confinement layer by depositing a new layer grown by epitaxis on the surface of the component designed to be positioned relative to the silicon support.

In Reference 2 the silicon support again constitutes the vertical mechanical reference for mounting the component. In this configuration the silicon lower confinement level is worked on to bring the optical guide near to the required level, i.e. close to the mechanical reference constituted by the silicon support.

In Reference 3 the top of the upper confinement layer acts as the mechanical reference; micronized shot welding techniques are also used.

In References 4 and 5, the mechanical reference is obtained by etching from the top of the upper confinement layer. In this technique two uncertainties are added: one related to the deposit and the other related to the etching.

SUMMARY OF THE INVENTION

To solve this problem the present invention proposes to achieve vertical alignment using a mechanical reference taken at the core of the optical guide or in a plane close to the core. This mechanical reference, which may be located at the bottom of the layer constituting the core of the optical guide, at the top of the optical guide, between the bottom and the top, or possibly under the core (in the lower confinement layer and close to the core), is considerably more accurate than commonly used mechanical references such as the top of the upper confinement layer or the bottom of the lower confinement layer. In fact, the optical reference (i.e. the optical axis of the optical guide) is only 2 to 3 $\mu$m from this mechanical reference and the inaccuracy of the vertical position of this layer does not exceed an absolute value of ±0.1 $\mu$m.

The invention therefore relates to a support designed for hybrid optoelectronics comprising at least one integrated optical guide and constituted using a substrate on which the optical guide has been produced by depositing a suitable material on the substrate to form a lower confinement layer, a guide core layer and an upper confinement layer, the optical guide being designed to be connected optically to an optoelectronic component mounted on the support, the support comprising means of positioning the component to ensure its optical alignment with the optical guide, such positioning means comprising abutments for the component to ensure its vertical positioning, characterized by the fact that said abutments are located at levels selected from among the following: the top of the core layer, an intermediate layer between the bottom of the core layer and its top, the top of the lower confinement layer, and an intermediate plane in the lower confinement layer.

The invention also relates to processes for producing such supports. In these processes the optical guide and the abutments may be created during the same steps of the process or during separate steps.

A first process produces abutments located at the top of the core layer. The process consists of the following steps:

the lower confinement layer is deposited on the substrate, the core layer is deposited on the lower confinement layer, the core layer and lower confinement layer are etched to produce the blank of an optical guide, leaving intact areas of the core layer designed to constitute said abutments, a sacrificial barrier layer is deposited on the previously-deposited layers, the sacrificial barrier layer is etched, remaining intact on the abutments, the upper confinement layer is deposited on the previously-deposited layers, the upper confinement layer is etched to finish the optical guide if necessary and to expose the protected areas of the sacrificial barrier layer, the protected areas of the sacrificial barrier layer are removed to expose the abutments.

In this process the core layer and lower confinement layer may either be etched simultaneously in a single step or successively in separate steps.

A second process produces abutments located at the bottom of the core layer. The process consists of the following steps:

the lower confinement layer is deposited on the substrate, the lower confinement layer is etched, possibly including the blank of an optical guide and leaving intact areas of the lower confinement layer at the bottom of the core layer designed to constitute said abutments, a sacrificial barrier layer is deposited on the lower confinement layer, the sacrificial barrier layer is etched, said sacrificial barrier layer remaining intact on the abutments, the core layer is deposited on the previously-deposited layers; the core layer may be etched to create the guide, the upper confinement layer is deposited on the core layer, the upper confinement layer and core layer are etched to finish the optical guide if necessary and to expose the protected areas of the sacrificial barrier layer, the protected areas of the sacrificial barrier layer are removed to expose the abutments.

A third process produces abutments located in an intermediate plane between the bottom of the core layer and its top. The process consists of the following steps:

the lower confinement layer is deposited on the substrate, the core layer is deposited on the lower confinement layer, the core layer and lower confinement layer are etched to produce the blank of an optical guide, leaving intact areas of the core layer designed to constitute said abutments, the abutments are created by etching the appropriate areas of the core layer, a sacrificial barrier layer is applied to the previously-deposited layers, the barrier layer is etched, said barrier layer remaining intact on the abutments, the upper confinement layer is deposited on the previously-deposited layers, the upper confinement layer is etched to create an optical guide if required and to expose the protected areas of the barrier layer, the protected areas of the barrier layer are removed to expose the abutments.

In this process the core layer and lower confinement layer may either be etched simultaneously in a single step or successively in separate steps.

A fourth process uses a technique known as "lift-off" to create abutments located on the top of the core layer. The process consists of the following steps:

the lower confinement layer is deposited on the substrate, the core layer is deposited on the lower confinement layer, the core layer and lower confinement layer are etched to produce the blank of an optical guide, leaving intact areas of the core layer designed to constitute said abutments, a layer of resin is deposited on the previously-deposited layers, a protective layer is deposited on the entire resin layer except in the zone where the future optical guide is to be located, the unprotected area of the resin layer is removed, the upper confinement layer is deposited on the abutments. previously-deposited layers, the remaining resin is removed using the "lift-off" technique, exposing the optical guide and the In this process the core layer and lower confinement layer may either be etched simultaneously in a single step or successively in separate steps.

BRIEF DESCRIPTION OF THE DRAWINGS

The invention will be better understood, and other advantages and characteristics will emerge, in the light of the following description. The description concerns examples that are given for explanatory purposes and are not intended to be restrictive. The description refers to the attached drawings where.

DESCRIPTION OF THE PREFERRED EMBODIMENTS

In the rest of the present description the support used as an example is made of silicon on which silica deposits are applied to produce optical guides. Only the vertical positioning will be described since horizontal positioning in the other two planes can be achieved using the known art.

Process No. 1

Figure 1A:
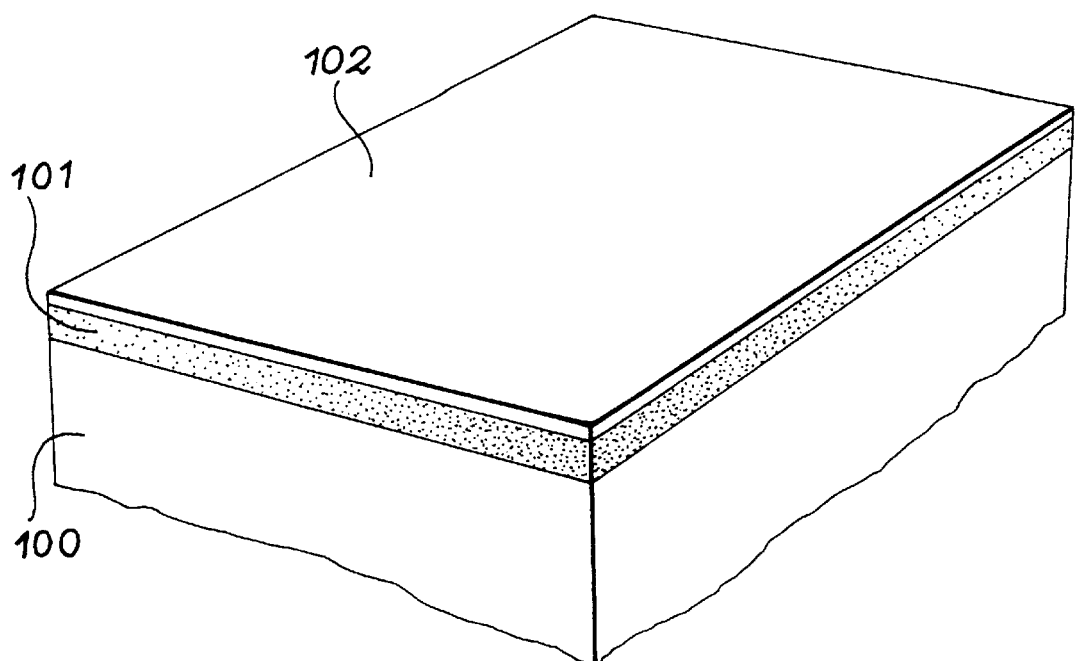
FIGS. 1A through 1F are partial views that show the first process for producing a support according to the invention, FIGS. 1A and 1B being perspective views, FIGS. 1C and 1E longitudinal cross-sections of the support in direction L as shown in FIG. 1B, and FIGS. 1D and 1F transversal cross-sections of the support in direction T as shown in FIG. 1B, FIGS. 2A through 2H are partial views showing the second process for producing a support according to the invention, FIGS. 2A, 2C, 2E and 2G being longitudinal cross-sections of the support and FIGS. 2B, 2D, 2F and 2H transversal cross-sections of the support.

The first process for producing a support according to the present invention begins by depositing a silica lower confinement layer 101 followed by a core layer 102 also made of suitably doped silica on one surface of a silicon substrate 100. This is shown in FIG. 1A.

Figure 1B:
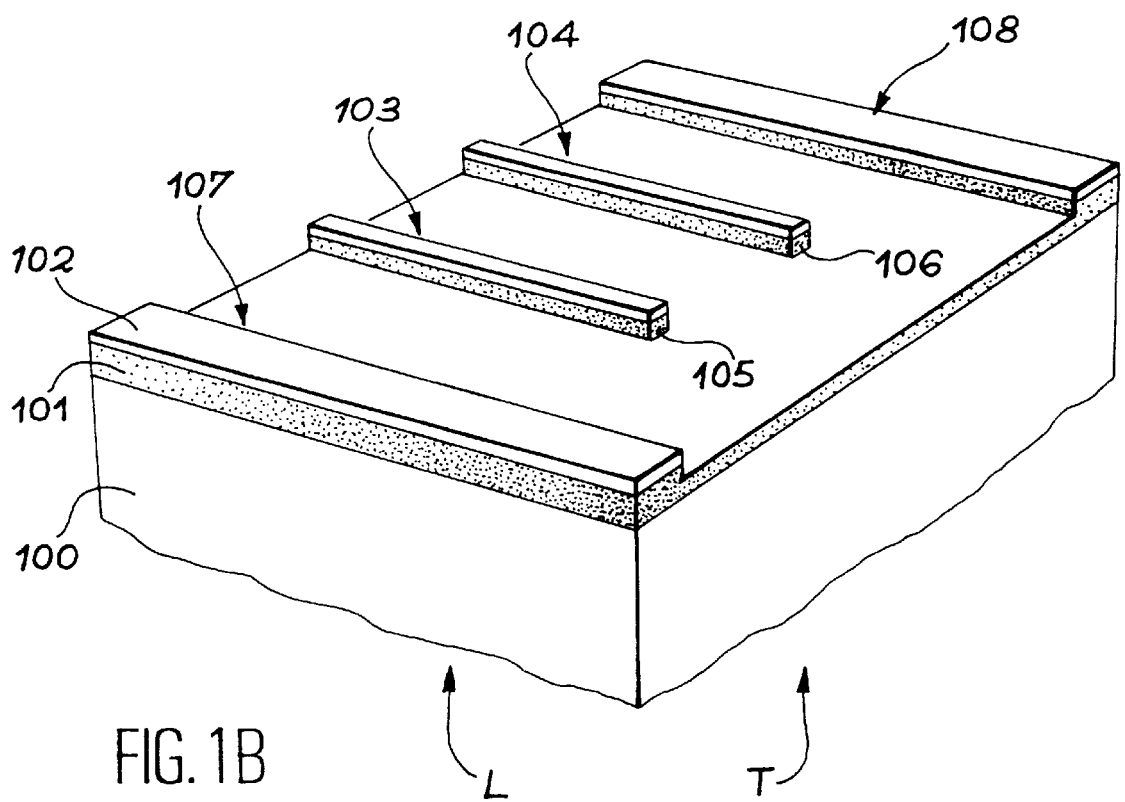

Layers 101 and 102 are then etched as shown in FIG. 1B. Although the entire thickness of layer 102 is etched, layer 101 is only etched to a certain depth. Masking techniques produce blanks 103 and 104 of two optical guides whose respective ends 105 and 106 are designed to be connected to the optical channels of an optoelectronic component mounted on the support. The masking also creates flanks 107 and 108 on each side of the group of guide blanks 103 and 104. These flanks are aligned parallel to guide blanks 103 and 104 and extend beyond ends 105 and 106 to enclose the mounted component.

A layer known as the sacrificial barrier layer is then deposited on etched layers 101 and 102. The barrier layer must be resistant to chemical attack, for example from reactive ionic etching, of the upper confinement layer that is subsequently deposited. It may, on the other hand, be removed by another method that only attacks silica. The barrier layer may also be metallic, e.g. aluminum. It may be chemically etched, for example using orthophosphoric acid $H_3PO_4$.

Figure 1C:
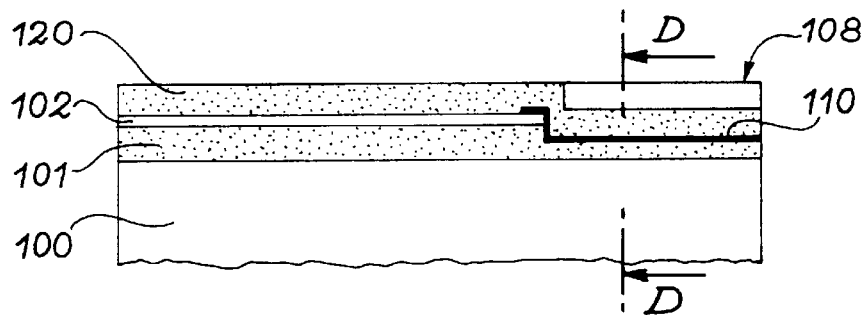
Figure 1D:
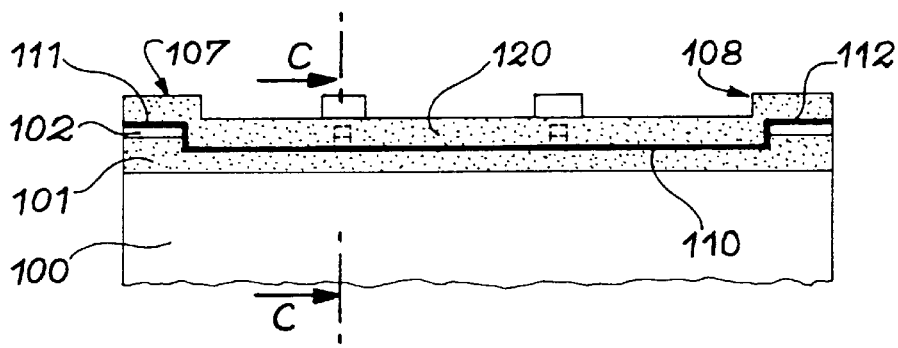

FIGS. 1C and 1D show this barrier layer 10 after etching. FIGS. 1C is a cross-section along axis CC of FIG. 1D. FIG. 1D is a cross-section along axis DD of FIG. 1C. It will be noted that etched areas 111 and 112 cover flanks 107 and 108 in the area of the support designed to support the optoelectronic component. Although not essential, these areas also cover the intact area of layer 101 located between flanks 107 and 108 that lies under the mounted component.

FIGS. 1C and 1D also show the newly-deposited silica upper confinement layer 120.

Figure 1E:
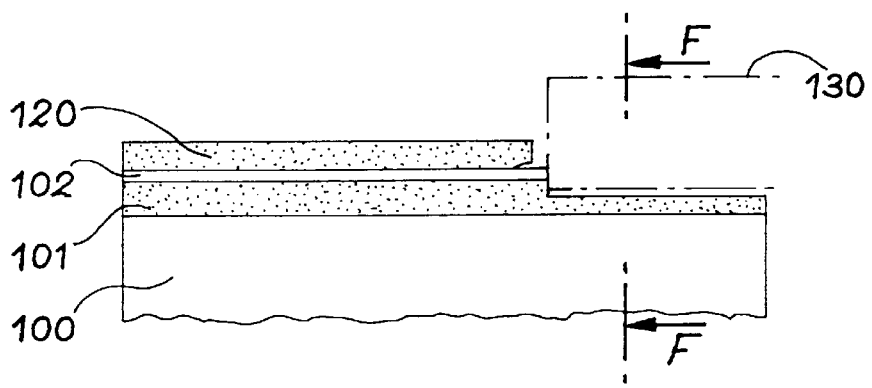
Figure 1F:
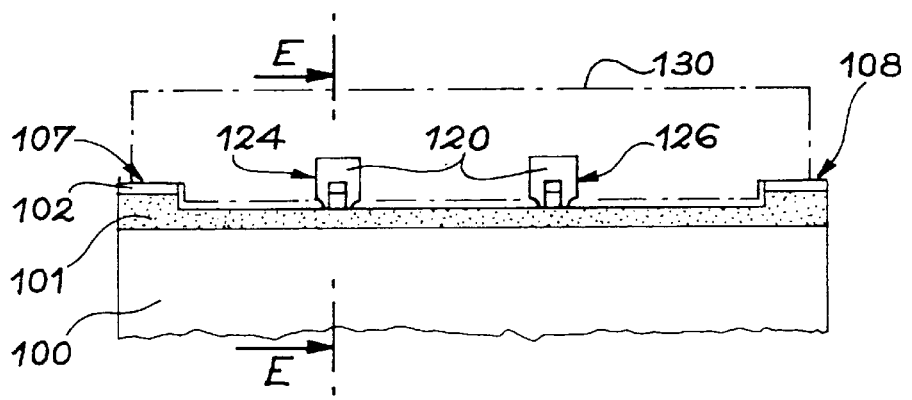

The upper confinement layer 120 is then etched using a mask that destroys the entire layer apart from the material required to finish the optical guides. This is shown in FIGS. 1E and 1F, where FIG. 1E is a cross-section along axis EE of FIG. 1F and FIG. 1F is a cross-section along axis FF of FIG. 1E. The exposed intact areas of the barrier layer have been removed.

The alternate dot/dash lines in FIGS. 1E and 1F show an optoelectronic component 130 mounted on the support. Its lateral edges rest on the top of core layer 102 and it is in optical contact with optical guides 124 and 126 on the support.

Process No. 2

Figure 2A:
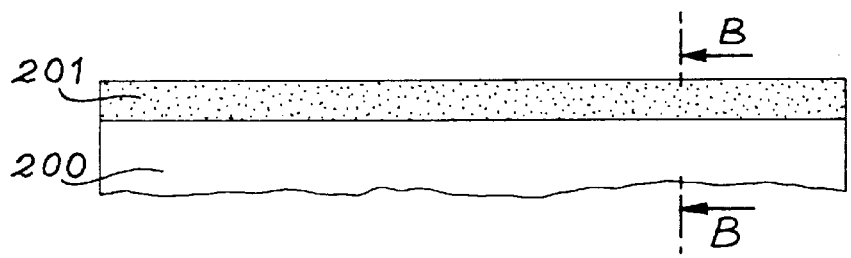
Figure 2B:
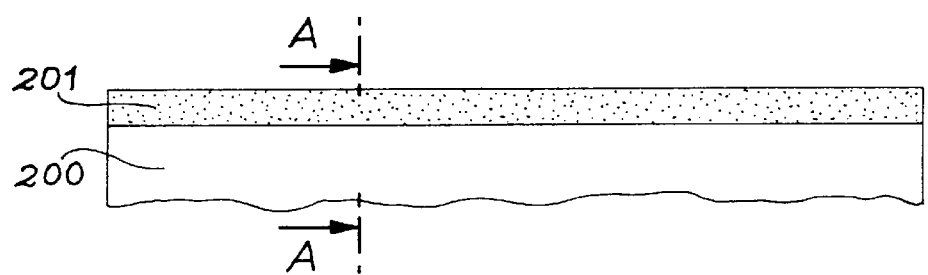

The second process for producing a support according to the present invention begins by depositing a silica lower confinement layer 201 on silicon substrate 200 as shown in FIGS. 2A and 2B where FIG. 2A is a cross-section along axis AA of FIG. 22 and FIG. 2B is a cross-section along axis BB of FIG. 2A.

Figure 2C:
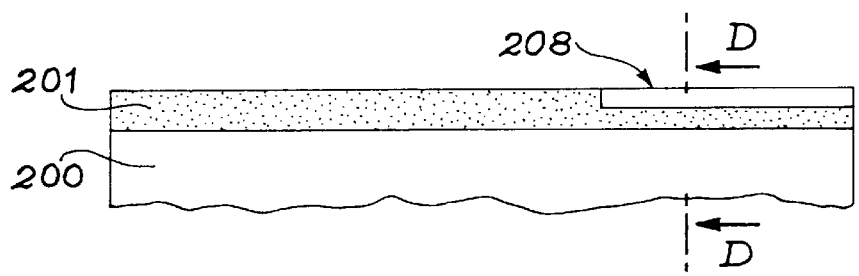
Figure 2D:
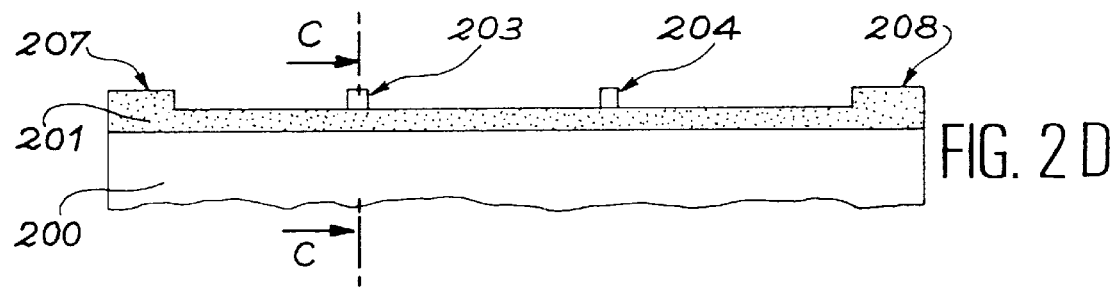

Layer 201 is then etched to a certain depth as shown in FIGS. 2C and 2D where FIG. 2C is a cross-section along axis CC of FIG. 2D and FIG. 2D is a cross-section along axis DD of FIG. 2C. The etching produces a shape similar to that etched into the lower confinement layer in Process No. 1 above, i.e. blanks of optical guides 203 and 204 and flanks 207 and 208.

Figure 2E:
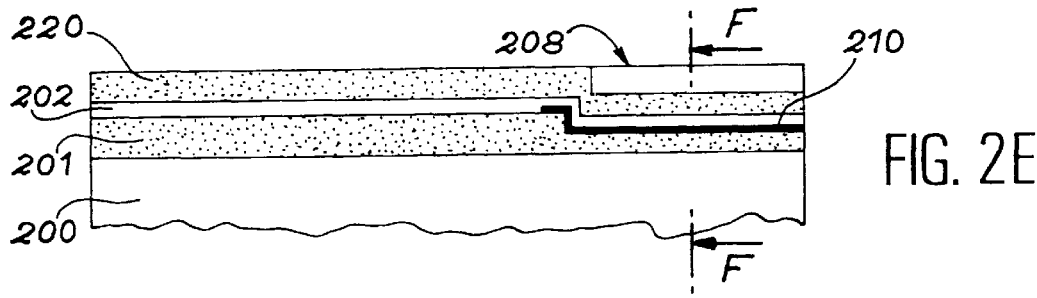

As in Process No. 1, a sacrificial barrier layer 210 is deposited on the etched lower confinement layer 201. The barrier layer is etched in a similar shape to that used in Process No. 1. It will be noted in FIG. 2F that etched areas 211 and 212 cover, in particular, flanks 207 and 208. FIG. 2E is a cross-section along axis EE of FIG. 2F while FIG. 2F is a cross-section along axis FF of FIG. 2E.

Figure 2F:
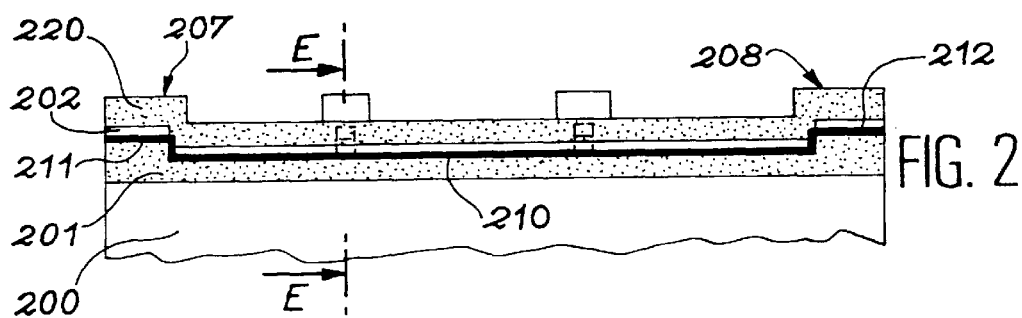

A core layer 202 is then deposited followed by upper confinement layer 220 (see FIGS. 2E and 2F).

Core layer 202 and upper confinement layer 220 are subsequently etched to finish the optical guides and expose the protected areas of the barrier layer that are subsequently removed.

Figure 2G:
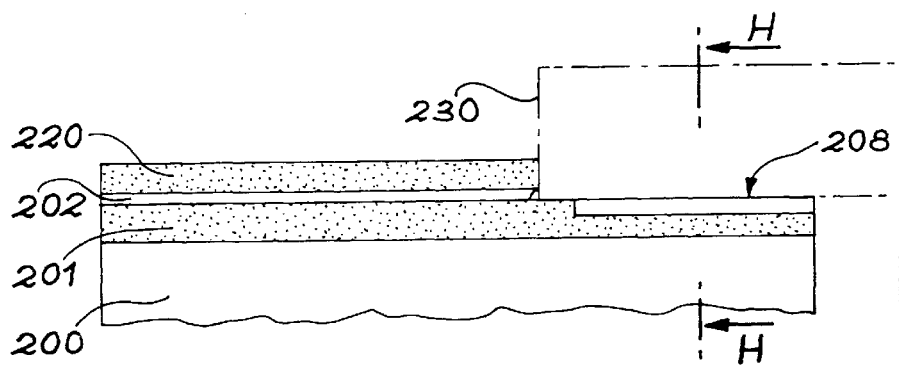
Figure 2H:
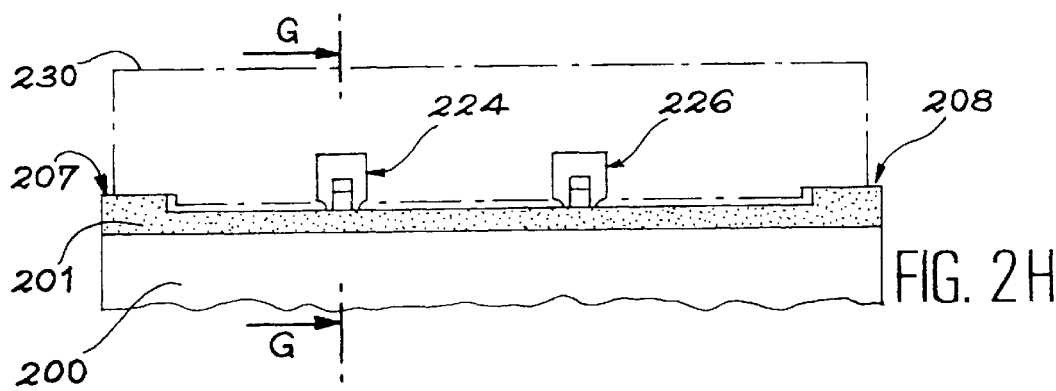

In FIGS. 2G and 2H, where FIG. 2G is a cross-section along axis GG of FIG. 2H and FIG. 2H is a cross-section along axis HH of FIG. 2G, the alternate dot/dash lines show an optoelectronic component 230 mounted on the support. Its lateral edges rest on the bottom of core layer 202 and it is in contact with optical guides 224 and 226 on the support.

Process No. 3

This process is shown in FIGS. 3A through 3J in which FIGS. 3A, 3C, 3E, 3G and 3I are cross-sections of FIGS. 3B, 3D, 3F, 3H and 3J respectively and FIGS. 3B, 3D, 3F, 3H and 3J are cross-sections of FIGS. 3A, 3C, 3E, 3G and 3I.

This process starts in the same way as Process No. 1. A lower confinement layer 301 is first deposited on substrate 300. A core layer 302 is then deposited. These two layers are etched to produce optical guide blanks 303 and 304 and flanks 307 and 308.

An intermediate, localized etching process is then carried out on the inner edges of the flanks to produce abutment 317 on flank 307 and abutment 318 on flank 308.

As in the preceding processes a barrier layer 310 is also deposited and etched to protect the abutments. An upper confinement layer 320 is then deposited on top of the previously-deposited layers.

Upper confinement layer 320 is then etched to finish optical guides 324 and 326 and expose the protected areas of barrier layer 310. These are then removed to expose abutments 317 and 318.

Figure 3A:
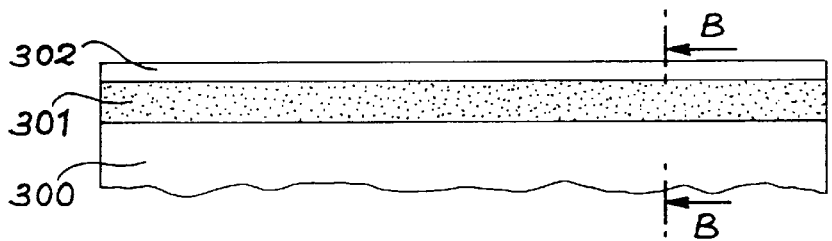
FIGS. 3A through 3J are partial views showing the third process for producing a support according to the invention, FIGS. 3A, 3C, 3E, 3G and 3I being longitudinal cross-sections of the support and FIGS. 3B, 3D, 3F, 3H and 3J transversal cross-sections of the support.
Figure 3B:
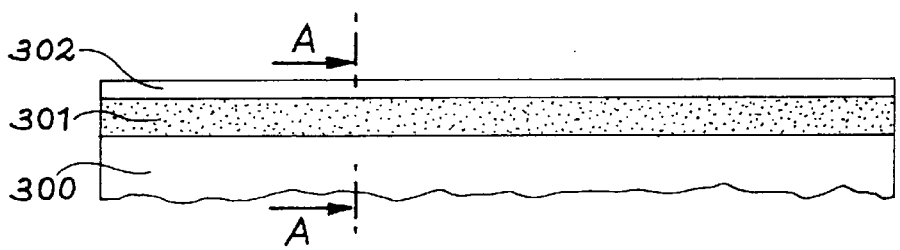
Figure 3C:
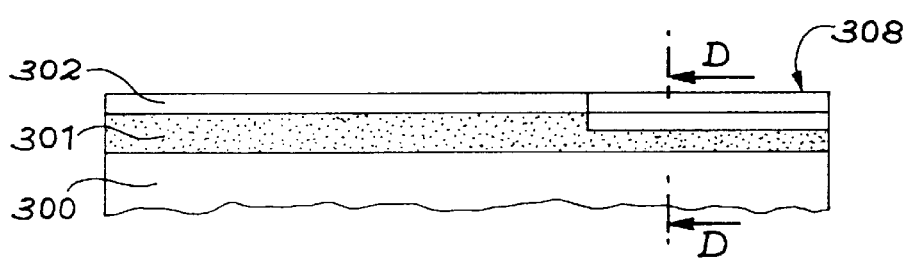
Figure 3D:
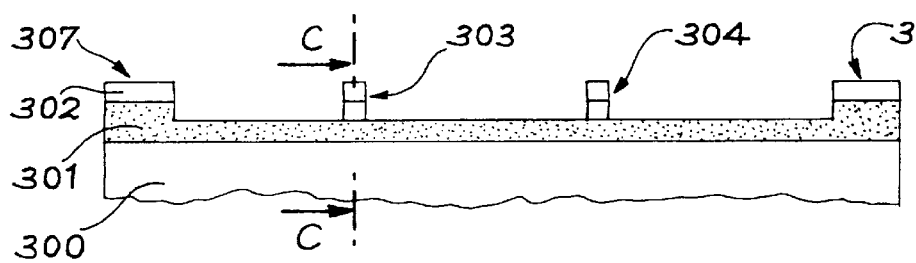
Figure 3E:
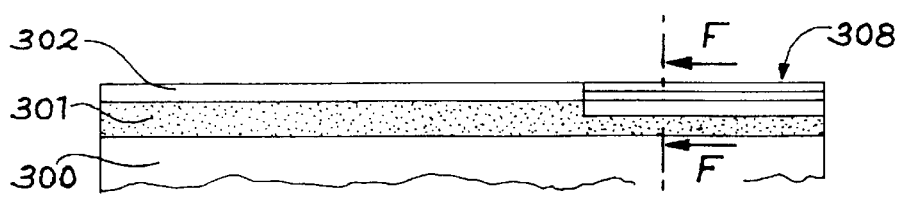
Figure 3F:
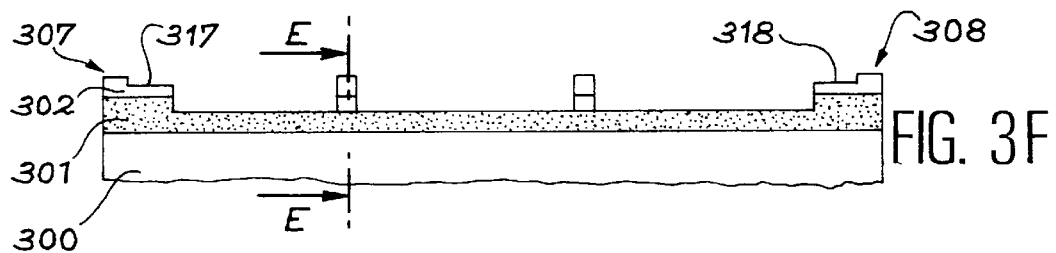
Figure 3G:
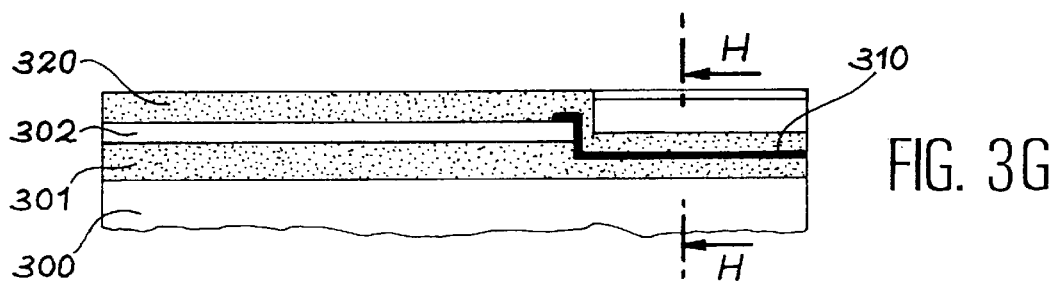
Figure 3H:
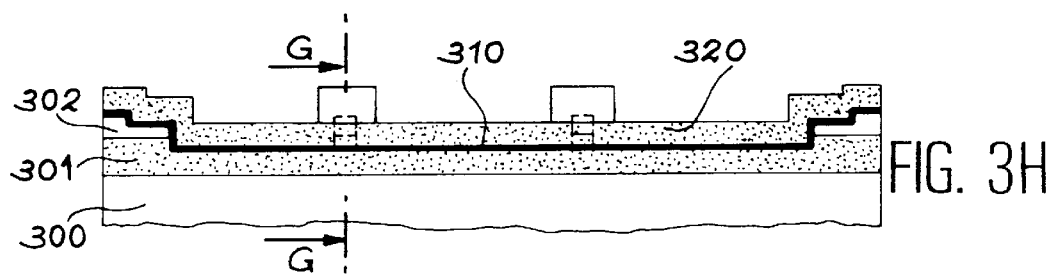
Figure 3I:
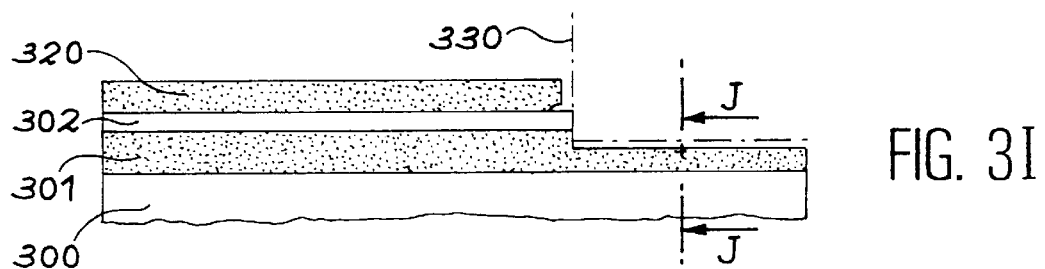
Figure 3J:
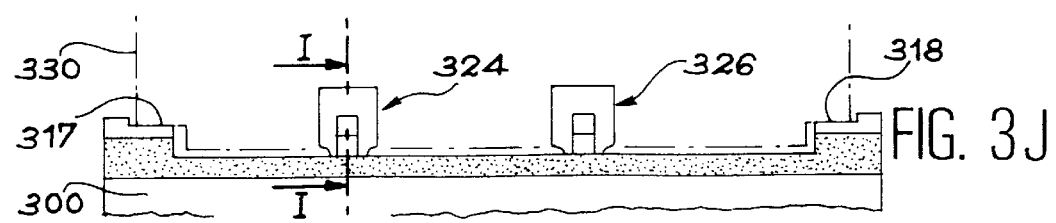

The alternate dot/dash lines in FIGS. 3I and 3J show an optoelectronic component 330 mounted on the support. Its lateral edges rest on the intermediate abutments 317 and 318 of core layer 302 and it is in contact with optical guides 324 and 326 on the support.

Process No. 4

Instead of depositing a barrier layer as in the previous processes, a technique known as the "lift-off" process is used to expose the abutments at the top or bottom of the core layer. This process is illustrated in FIGS. 4A through 4H which show the abutments created at the top of the core layer.

Figure 4A:
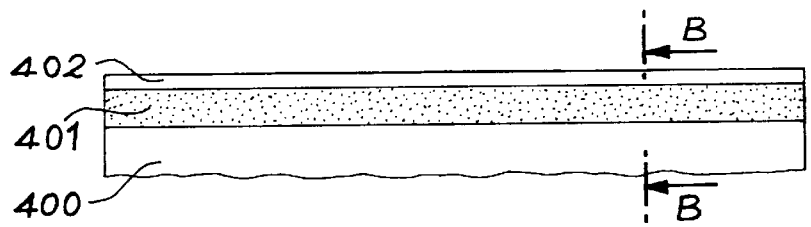
FIGS. 4A through 4H are partial views showing the fourth process for producing a support according to the invention, FIGS. 4A, 4C, 4E and 4G being longitudinal cross-sections of the support and FIGS. 4B, 4D, 4F and 4H transversal cross-sections of the support.
Figure 4B:
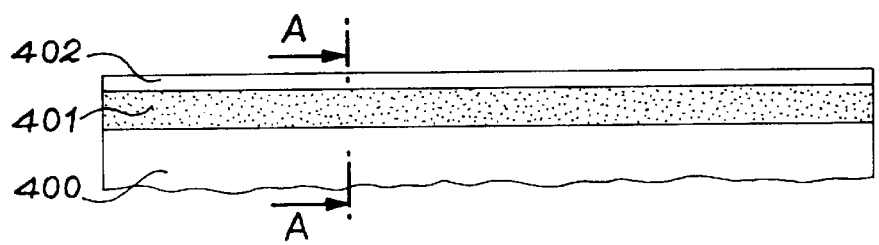
Figure 4C:
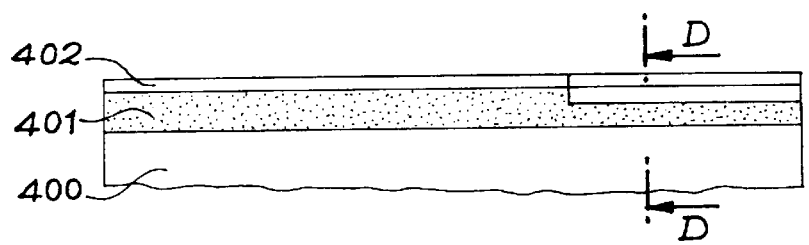
Figure 4D:
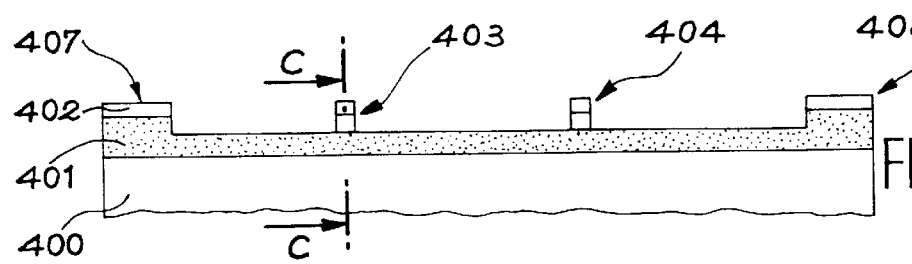
Figure 4E:
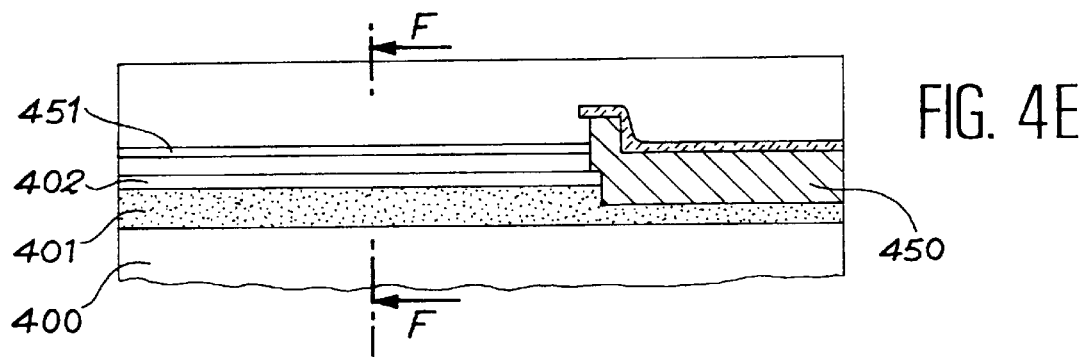
Figure 4F:
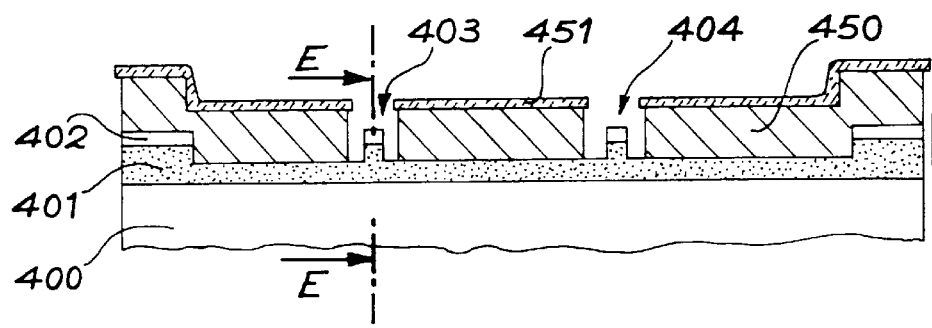
Figure 4G:
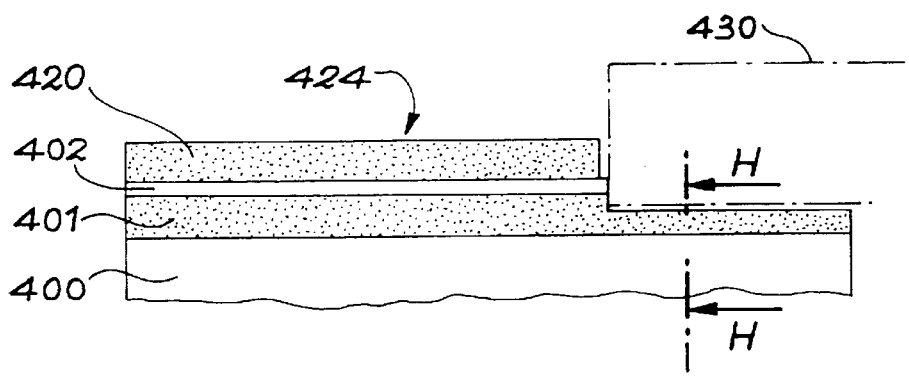
Figure 4H:
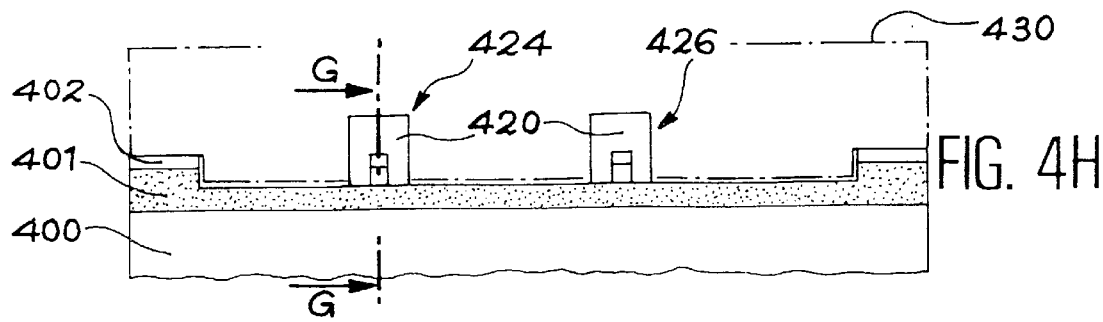

A lower confinement layer 401 is first deposited on substrate 400 followed by a core layer 402 (see FIGS. 4A and 4B). These two layers are etched to produce blanks of optical guide 403 and 404 and flanks 407 and 408 (see FIGS. 4C and 4D).

A layer of resin is then deposited on the previously-deposited layers. A protective layer is then deposited on the areas of the resin to be protected, i.e. the entire surface of the resin except the areas where the optical guides are to be located. The etching produces the results seen in FIGS. 4E and 4F where resin layer 450 and protective layer 451 will be observed together with exposed guide blanks 403 and 404.

A confinement layer is then deposited on the previously-deposited layers. The intact resin is then removed using the "lift-off" technique. This produces the structure seen in FIGS. 4G and 4H where upper confinement layer 420 is reduced to the area covering optical guides 424 and 426. The alternate dot/dash lines show an optoelectronic component 430 mounted on the support. Its lateral edges rest on top of the core layer and it is in optical contact with optical guides 424 and 426.

Among the components that may be mounted on the support according to the invention the following may be given as examples:

a semiconductor laser source emitting via the edge; this may be a single source or a one-dimensional bank or strip of sources, a semiconductor amplifier; this may also be a single component or a strip of components, a LiNbO$_3$ integrated optical modulator, a doped glass integrated optical amplifier, one or more optical fibers housed in a micromechanical support; this may also be a single component or a strip of components produced by V-shaped etching in the silicon.

The abutments created according to the invention are not necessarily lateral. They may be positioned differently depending on the components to be mounted.

We claim:

1. A support for use in the field of hybrid optoelectronics comprising at least one integrated optical guide and including a substrate on which the optical guide is created by applying a deposit of a suitable material to the substrate to create a lower confinement layer, a guide core layer and an upper confinement layer, the optical guide being designed to be optically connected to an optoelectronic component mounted on the support, the support comprising means for positioning the component to ensure its optical alignment with the optical guide, said positioning means comprising abutments to ensure the vertical positioning of the component, wherein said abutments are located at one of the following levels: the top of the core layer, an intermediate plane between the bottom of the core layer and its top, the top of the lower confinement layer, and an intermediate plane within the lower confinement layer, and wherein the abutments are independent from the upper confinement layer.

2. The support according to claim 1, wherein the substrate includes silicon and the optical guide includes silica.

3. An optical support device, comprising:

a substrate;

an optical guide disposed on the substrate and including a lower confinement layer, a guide core layer, and an upper confinement layer; and at least two abutments disposed on the substrate and configured to support an optoelectronic component and align an optical axis of the optical guide with an optical axis of the optoelectronic component, wherein the at least two abutments are independent from the upper confinement layer and are positioned at one of the following levels:

1) a top of the core layer;
   2) an intermediate plane between a bottom of the core layer and the top of the core layer;
   3) a top of the lower confinement layer; and
   4) an intermediate plane within the lower confinement layer.

4. The device according to claim 3, wherein the substrate includes silicon and the optical guide includes silica.

5. The device according to claim 3, wherein the at least two abutments include etched regions etched from at least one of the lower confinement layer and the core layer used to form the optical guide.

6. The device according to claim 3, wherein the at least two abutments include etched regions from flanks including at least one of the lower confinement layer and the core layer used to form the optical guide, and wherein the flanks are substantially parallel to the optical guide and extend beyond ends of the optical guide so as to enclose the optoelectronic component.

* * * * *